Aug. 8, 1967     J. B. POND     3,334,424

DEVICE FOR USE IN TESTING REACTION TIME

Filed Nov. 15, 1965     2 Sheets-Sheet 1

Inventor
John Brown Pond
By Cushman, Darby & Cushman
Attorneys

Aug. 8, 1967  J. B. POND  3,334,424
DEVICE FOR USE IN TESTING REACTION TIME
Filed Nov. 15, 1965  2 Sheets-Sheet 2

Inventor
John Brown Pond
By Cushman, Darby & Cushman
Attorneys

United States Patent Office 3,334,424
Patented Aug. 8, 1967

3,334,424
DEVICE FOR USE IN TESTING
REACTION TIME
John Brown Pond, Oak Farm, 216 Prospect Road,
Farnborough, England
Filed Nov. 15, 1965, Ser. No. 507,803
Claims priority, application Great Britain, Nov. 17, 1964,
46,851/64
10 Claims. (Cl. 35—22)

According to the present invention, there is provided a device for use in testing reaction time, comprising a reservoir for containing liquid and disposed in the region of a lower end of said device, a transparent, narrow-bore tube extending upwardly away from said reservoir, connecting means connecting said reservoir to the upper end of said tube and serving to lead said liquid towards said upper end on inversion of said device, rapidly closable valve means operable to stop rapidly flow of said liquid in said tube on righting of said device following inversion thereof, and return means connecting said tube to said reservoir for returning said liquid from said tube to said reservoir.

Figure 3:
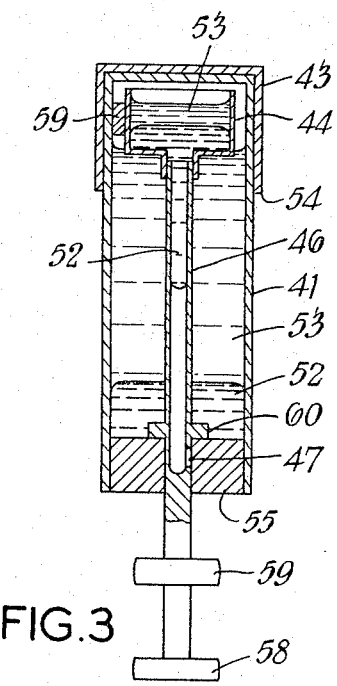
Figure 4:
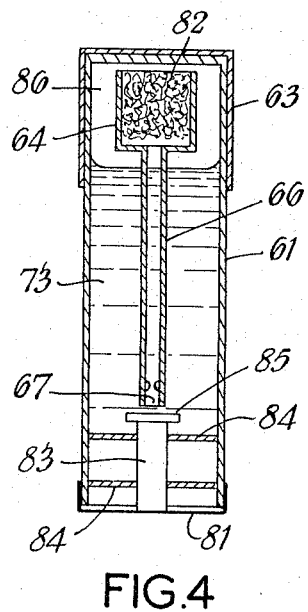
Figure 5:
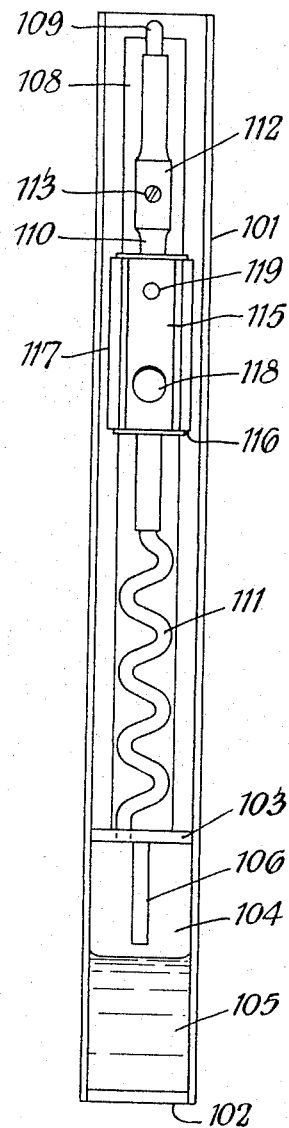
Figure 6:
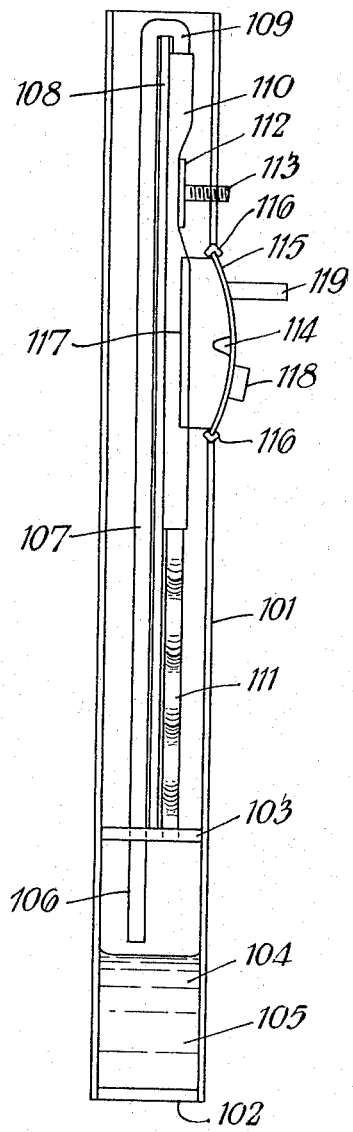

In order that the invention may be clearly understood and readily carried into effect, reference will now be made, by way of example, to be the accompanying drawings, in which:

FIGURES 1 to 4 show vertical axial sections through respective different versions of a device for use in testing reaction time, and FIGURES 5 and 6 show respectively a rear elevation and a side elevation of a further modified version of the device.

Figure 1:
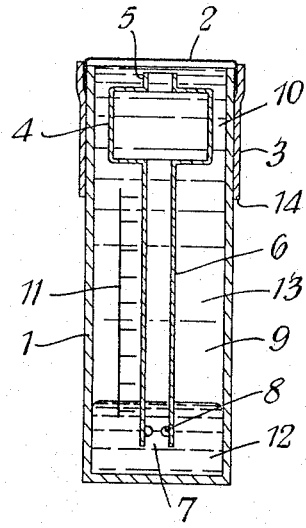

Referring to FIGURE 1, the device includes a liquid-tight casing consisting of a transparent cylinder 1 open at its upper end, a diaphragm 2 closing the upper end of the cylinder 1, and an opaque sleeve 3 retaining the diaphragm 2 on the cylinder 1. The diaphragm can either be a simple rubber diaphragm, or a snap-action metal cap. A receptacle 4 is fixed in the casing near the diaphragm 2, and is provided with a small projecting inlet mouth 5 over which the diaphragm 2 can be pressed by the thumb of a user to close the mouth. A transparent, narrow-bore tube 6 is disposed in the casing and has its interior in communication with the interior of the receptacle 4. The tube 6 extends from the receptacle downwardly towards the lower end of the casing, and at its own lower end has an outlet 7 which is preceded by a constriction 8. The outlet 7 connects the interior of the tube with a space 9 between the tube and the casing. The mouth 5 connects with the interior of the receptacle 4 a space 10 which is located between the receptacle and the casing and which is in communication with the space 9. A scale 11 is marked on the cylinder 1 over a portion thereof through which the tube 6 can be seen. The lower end of the casing forms a reservoir containing mercury 12, and the remainder of the casing is substantially filled with a transparent liquid 13, for example water, having a lower specific gravity than mercury. The liquid 13 can be a coloured transparent liquid if desired, and also serves to magnify the tube 6.

To use the device shown in FIGURE 1, it is inverted so that the mercury 12 travels to that end of the casing containing the receptacle 4, whereby the receptacle is at least partly filled with mercury. Thereupon, the user passes the diaphragm over the mouth 5, and then inverts the device to return the casing to the position shown in FIGURE 1. The mercury not in the receptacle falls to the reservoir at the lower end of the casing, while the mercury in the receptacle is not able to flow down the tube 6 until the mouth 5 has been opened by removal of the user's pressure on the diaphragm 2, because the tube 6 is in fact much narrower than has been shown in the figure for ease of illustration. On opening of the mouth 5, a mercury-water separation surface will pass down the tube 6. As this separation surface just becomes visible past the lower edge 14 of the opaque sleeve 3, the user immediately depresses the diaphragm 2 to close the mouth 5, and thus stop further movement of the separation surface. The length of time taken to do this represents the user's reaction time, and can preferably be read directly from the scale 11.

Figure 2:
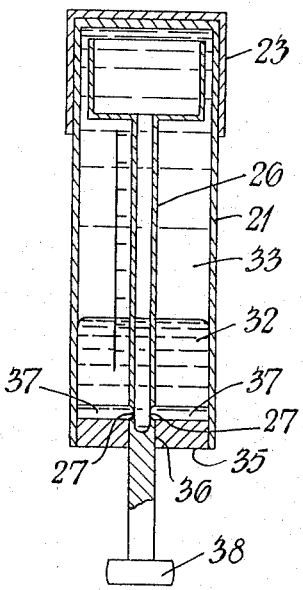

In the version shown in FIGURE 2, a transparent cylinder 21 is open at its lower end and is covered at its upper end by an opaque cap 23. The lower end of the cylinder is closed by a bung 35 provided with a central bore 36 from which extend two radial notches 37 formed in the top surface of the bung. A tube 26 is provided at its lower end with a knob 38 by means of which the tube 26 can be rotated about its own axis, whereby two diametrically opposite outlets 27 of the tube 26 are movable between positions in which they are closed by the bung 35, on the one hand, and positions in which they are in registry with the notches 37, on the other hand. The basic difference between the version of FIGURE 1 and the version of FIGURE 2 is that the latter version has a rotary valve arrangement instead of the valve arrangement consisting of the diaphragm 2 and inlet mouth 5. Otherwise the operation of the device of FIGURE 2 is the same as that of FIGURE 1, mercury 32 and transparent liquid 33 again being provided.

With regard to FIGURE 3, a receptacle 44 is fixed by a member 59 to a wall of a cylinder 41, which at its lower end is closed with a bung 55 and at its upper end is provided with an opaque cap 43. In this version, a knob 58 is used not for rotating the tube 46 but for displacing the tube 46 axially, relatively to a receptable 44. Annular flanges 59 and 60 limit the extent to which the knob 58 can be displaced towards and away from the casing. The tube 46 is formed with an outlet 47 which in the position shown is closed by the bung 55. In operation, the receptacle 44 is filled with water and mercury by inversion of the device and then return of the device into the initial position, the knob 58 meanwhile being retained in its innermost position, so that the upper end of the tube 46 is disposed above the uppermost liquid level in the receptacle 44 when the device has been returned to its initial position. Gradual lowering of the tube 46 causes first water 53 and then mercury 52 to pour into the tube 46 from the receptacle 44. When a water-mercury separation surface appears from behind the edge 54, then the user immediately displaces the tube 46 axially outwardly until the valve 47 is closed by the bung 55 and the flange 60 abuts against the bung.

In the version of FIGURE 4, a cylinder 61 is provided at its upper end with an opaque cap 63 and is closed at its lower end by a diaphragm 81. A tube 66 and a receptacle 64 are fixed relatively to the casing and the receptacle is partly filled with wire wool 82. The diaphragm 81 carries a valve stem 83 which is guided by annular discs 84 slidably fitting in the cylinder 61. The stem 83 carries at its upper end a rubber pad 85 for closing a mouth 67 at the lower end of the tube 66. In this device there are provided a transparent liquid, for example water, 73 and air 86. The tube 66 is here again formed with the scale (not shown). The operation of this version is basically similar to that of the other versions, except that an air-water separation surface 13 is employed, the wire wool 82 being provided to give steady flow of first air and then water into the tube 66, thus preventing a large number of air bubbles from travelling along the tube 66 and spoiling the test.

Referring to FIGURES 5 and 6, a casing 101 in the form of a transparent plastics tube is closed at its lower end by a bung 102 and is open at its upper end. However, at a short distance above its lower end, it is closed by a bung 103, whereby a reservoir 104 is formed between the two bungs 102 and 103. The reservoir 104 contains a coloured liquid 105, and into the reservoir extends a lower extension 106 of a straight transparent glass tube 107 to the rear of which is a scale 108 fixed to the bung 103 and formed with graduations (not seen) at its front face. The tube 107 has an upper extension 109 which bends over the upper end of the scale 108 and has fitted thereon the upper end of a rubber conduit 110, the lower end of which is fitted on the upper end of a serpentine glass duct 111. The bung 103 has through bores receiving the tube 107 and the duct 111. At a location along the conduit 110, a throttling plate 112 squashes the conduit against the scale 108, the pressure of the plate 112 against the conduit 110 being adjustable by means of a set screw 113 which acts in a recess in the outer major face of the plate and which is received in a threaded bore in the casing 101. Adjustment of the plate 112 adjusts the speed of flow of the liquid 105 through the syphon having its taller arm formed by the parts 106 and 107, and its shorter arm formed by the parts 109 to 111. A closure member 114 of triangular section, but having a blunt working edge, is fixed to the inner face of a snap-action leaf spring 115 mounted at its ends in V-section bearing pieces 116 provided at upper and lower edges of an aperture 117 formed in the casing 101. Fixed to the outer face of the spring 115 is a press button 118 for use in displacing the leaf spring 115 towards the conduit 110 to cause the member 114 to squash the conduit completely at the location of the member 114, thereby to stop rapidly flow of liquid in the tube 107. A short rod 119 also fixed to the outer face of the spring 115 enables the user to pull the spring back into the position shown.

In operation, on inversion of the device, the liquid fills the duct 111 and the conduit 110, and fills the tube 107 by way of the extension 109, the air displaced escaping into the reservoir through the extension 106. On righting of the device, because of the syphonic effect the pertinent air-liquid separation surface travels up the shorter arm of the syphon, slowly at first owing to the flow of the liquid through the throttle 112, 113, but then quickly when the separation surface has passed through the throttle. The valve 114, 115 is operated by the user as soon as possible after appearance of the separation surface at a reference point on the tube 107. The serpentine form of the duct 111 serves to lengthen the time taken by the separation surface to reach the reference point. It will be understood that the diameter of the syphon is advantageously not so great that a substantial amount of the liquid in the shorter arm flows down the inside walls of the shorter arm instead of as a column up the arm. Similarly, the diameter of the tube 107 is advantageously not so small that substantial capillary rise occurs after closing of the valve. Adjustment of the throttle 112, 113, to alter the delay time, i.e. the time between righting of the device and appearance of the separation surface at the reference point, can be made without involving re-calibration of the scale because the speed of movement of the separation surface down the tube 107 is practically unaffected by the setting of the throttle.

The scale 108 can be made approximately linear by so arranging the dimensions of the syphon and the viscosity of the liquid 105 that, before the separation surface reaches the reference point, the force on the liquid column due to gravity is balanced by opposing forces. The extension 106 can be provided, if desired, with a restriction having the effect of making the graduations closer together at the lower end of the scale 108 than at the upper end.

What is claimed is:

1. A device for use in testing reaction time, comprising a reservoir for containing liquid and disposed in the region of a lower end of said device, a transparent, narrow-bore tube extending upwardly away from said reservoir, connecting means connecting said reservoir to the upper end of said tube and serving to lead said liquid towards said upper end on inversion of said device, rapidly closable valve means operable to stop rapidly flow of said liquid in said tube on righting of said device following inversion thereof, and return means connecting said tube to said reservoir for returning said liquid from said tube to said reservoir.

2. A device according to claim 1, and further comprising a scale extending along said tube.

3. A device according to claim 2, wherein said scale is spaced outwardly of said tube.

4. A device according to claim 1, and further comprising a casing encircling said tube and bounding said reservoir, and transparent wall portions of said casing through which said tube is visible.

5. A device according to claim 1, and further comprising an adjustable throttle adjustable to adjust the speed of flow of said liquid in said tube.

6. A device according to claim 5, wherein said connecting means comprises a conduit comprised of flexible material, and said throttle comprises a member displaceable to squash said conduit to an adjustable extent at a predetermined location along said conduit.

7. A device according to claim 1, and further comprising a syphon of which the taller arm comprises said tube and the shorter arm comprises said connecting means.

8. A device according to claim 7, wherein said connecting means comprises a duct of serpentine form.

9. A device according to claim 1, wherein said connecting means comprises a conduit comprised of flexible material, and said valve means comprises a snap-action closure member displaceable to squash said conduit at a pre-determined location along said conduit.

10. A device according to claim 9, wherein said valve means further comprises a leaf-spring providing the snap action and having said closure member mounted thereon.

References Cited

UNITED STATES PATENTS 2,995,371  8/1961  Nelson _____ 35—22 X

EUGENE R. CAPOZIO, *Primary Examiner.*

W. GRIEB, *Assistant Examiner.*